United States Patent [19]

Quadir et al.

[11] Patent Number: 5,366,669
[45] Date of Patent: Nov. 22, 1994

[54] INJECTION MOLDING OF CERAMIC ARTICLES USING AQUEOUS BASED THERMOPLASTIC RESIN

[75] Inventors: Tariq Quadir, Columbia, Md.; James D. Jones, Shreve; Jyoti P. Chakraverty, Wooster, both of Ohio

[73] Assignee: Ferro Corporation, Cleveland, Ohio

[21] Appl. No.: 80,271

[22] Filed: Jun. 21, 1993

[51] Int. Cl.⁵ ................. C04B 33/30; C04B 33/32
[52] U.S. Cl. ................................. 264/6; 264/63; 264/328.2
[58] Field of Search .................. 264/63, 328.2, 6

[56] References Cited

U.S. PATENT DOCUMENTS

| 4,496,506 | 1/1985 | Sakato et al. | 264/63 |
| 4,618,648 | 10/1986 | Marten | 525/60 |
| 4,675,360 | 6/1987 | Marten | 525/60 |
| 4,968,460 | 11/1990 | Thompson et al. | 264/6 |

*Primary Examiner*—James Derrington
*Attorney, Agent, or Firm*—Rankin, Hudak & Hill

[57] ABSTRACT

Polyvinyl alcohol copolymers are used as binder in an aqueous ceramic particle slurry for injection molding green ceramic bodies. The slurry is dried to form a coated powder which is then heated and injection molded into a desired shape. The molded shape is then fired to remove the binder and produce a dense ceramic part. The dense parts do not show any knit lines from the injection molding step.

13 Claims, No Drawings

INJECTION MOLDING OF CERAMIC ARTICLES USING AQUEOUS BASED THERMOPLASTIC RESIN

BACKGROUND OF THE INVENTION

Ceramic articles for various uses have been fabricated by many techniques. In the manufacture of many ceramic articles, a "green" body is formed of ceramic powder, binder, and possibly other ingredients. The green body is then typically fired to remove the binder and sinter the ceramic powder to form the ceramic article. The shape of the sintered article generally corresponds to the shape of the green body. Various methods have been used to make green bodies of a desired shape. One of those methods is injection molding.

In injection molding, a mixture containing ceramic powder, a binder and possibly other ingredients is injected into a mold corresponding to the desired green body shape. Typically, the mixture is heated to lower its viscosity before molding. The mixture is allowed to harden in the mold, and the mold is then removed to recover the green body. The green body is then fired to remove the binder and sinter the ceramic powder.

Several methods have been used to form the mixture to be injected. In some processes, the ceramic powder and the binder are directly mixed together by kneading. Kneading methods generally suffer from poor dispersion of the binder and ceramic resulting in defects in the final structure. The binder systems used in the kneading technique generally require long binder burnout times. Most systems using kneading also have problems with defects such as knit lines due to relatively high molding pressures. While some attempts have been made to address the binder burnout issue by using exotic additives (e.g. U.S. Pat. No. 4,784,812), these solutions add extra cost and do not address other problems associated with methods using kneading.

The other principle approach to forming the mixture for injection involves the formation of a dispersion of ceramic powder in a dispersion medium which also contains the binder. In most dispersions, the dispersion medium is a solvent for the binder whereby the binder is dissolved and distributed among the ceramic particles. Once the dispersion is formed, some or all of the dispersion medium is removed by drying. In some cases, the dispersion is dried to form a free flowing powder. The dispersion method has worked best with systems using organic solvents. Unfortunately, organic solvents present environmental problems in the drying stage. Water soluble binders systems used previously have not exhibited good flow characteristics on injection. Thus, the problems of defects, knit lines, etc. still exist for these systems.

Thus, there remains a need for an effective injection molding system for making ceramic bodies.

SUMMARY OF THE INVENTION

The invention provides an injection molding method which is largely free from the disadvantages of the prior art. The method of the invention avoids the use of organic solvents and the need for long binder burnout times while still producing dense, substantially defect-free parts.

The method of the invention comprises:

a) combining ceramic powder, water and a water soluble polyvinyl alcohol copolymer binder to form a slurry,
b) drying the slurry to form coated ceramic particles;
c) heating the coated particles,
d) injecting the heated particles into a mold to form a green ceramic body,
e) cooling the green ceramic body,
f) recovering the cooled body, and
g) firing the recovered body to remove the binder and to sinter the ceramic.

The copolymer binder is preferably a copolymer of polyvinyl alcohol and poly(alkyleneoxy) acrylate. Preferably, the slurry also contains a polyol plasticizer. The method of the invention can be used to form bodies from virtually any sinterable ceramic powder.

DETAILED DESCRIPTION OF THE INVENTION

The method of the invention involves the steps of:

a) combining ceramic powder, water and a water soluble polyvinyl alcohol copolymer binder to form a slurry,
b) drying the slurry to form coated ceramic particles;
c) heating the coated particles,
d) injecting the heated particles into a mold to form a green ceramic body,
e) cooling the green ceramic body,
f) recovering the cooled body, and
g) firing the recovered body to remove the binder and to sinter the ceramic.

The ceramic powder may be any known ceramic material or combination of ceramic materials. Preferably, the ceramic powder is a sinterable powder. The ceramic powder may also include a sintering aid(s). Examples of ceramic powders are alumina, zirconia, titania, mullite, silicon nitride, silica, silicon carbide, zirconium aluminum titanate and mixtures thereof. The particle size of the ceramic powder may be any particle size distribution known to be suitable for injection molding and/or sintering.

The polyvinyl alcohol copolymer binder is preferably a polyvinyl alcohol poly(alkyleneoxy) acrylate copolymers. Such polymers are disclosed in U.S. Pat. Nos. 4,618,648 and 4,675,360. A preferred copolymer is sold by Air Products and Chemicals, Inc. as Vinex ® 2019. The amount of copolymer binder used is preferably about 13–16 wt. % based on the weight of the ceramic powder.

The water used in the slurry may be from any conventional source. Deionized water is generally preferred. The amount of water should be adequate to allow dispersion of all the slurry ingredients. The total water content of the slurry is preferably about 25–60 wt. %.

Preferably, the slurry also contains a plasticizer. Polyols such as triethylene glycol, glycerol and polyethylene glycol are preferred plasticizers, triethylene glycol being most preferred. Diamines such as Texaco Chemical Co.'s Jeffamine ® ED-6000 may also be used as plasticizers. The amount of plasticizer used is preferably about 30–50 wt. % based on the weight of polyvinyl alcohol copolymer.

If desired, a dispersant may be added to the slurry. A preferred dispersant is Darvan ® 821A sold by R. T. Vanderbilt Co. The amount of dispersant used is preferably about 1.0–1.25 wt. % based on the weight of the dry powder ingredients.

It may be desirable to adjust the pH of the slurry to facilitate dispersion of the ingredients. The desired pH may depend on the specific dispersant used, if any. The pH may be adjusted by the addition of a suitable acid, base or salt. For Darvan ® 821A, ammonium hydroxide is a preferred pH adjusting agent. Other known expedients may also be added to the initial slurry such as defoaming agents, etc.

The slurry ingredients may be combined in any order of addition. It is generally preferred to dissolve the polyvinyl alcohol copolymer binder in a portion of the water. If pH adjustment is necessary, the pH of the remaining water is adjusted and the ceramic powder is added (as well as the dispersant, if any) to form the initial slurry. The dissolved copolymer is then added to the slurry. The plasticizer may be added to the dissolved copolymer or to the slurry. The slurry may be mixed by any conventional means to achieve a good dispersion.

The slurry is then dried to form coated ceramic particles. The moisture content of the coated particles is preferably less then 1 wt. %, more preferably about 0.5 wt. % or less, most preferably 0.3 wt. % or less. The drying may be performed in any conventional manner such as spray drying, pan drying, paddle drying or fluidized bed drying. Spray drying and fluidized bed drying are preferred. The drying temperature should not be so excessive as to cause melting of the copolymer. Preferably, the drying temperature is about 60°–130° C. Vacuum may also be applied to facilitate drying.

The coated particles are collected and then heated to soften the binder and transform the coated particles to a coherent flowable mass for molding. The heating is preferably done to achieve a molding temperature of about 150°–190° C.

The injection molding is preferably done at a pressure of about 3000–4500 psi. The mold may be heated to facilitate flow of the molded particles. Once the mold is filled, the injection is stopped and the molded green body is allowed to cool and harden. The green body can then be removed from the mold.

The green body is then fired to remove the binder. Binder removal is preferably done at 500°–600° C. for about 60–85 hours. The atmosphere is preferably an oxygen-containing atmosphere such as air. The body is then fired to sinter the ceramic. The sintering conditions may vary depending on the ceramic material and the desired end product. The sintering conditions are preferably those conventionally used for the ceramic material involved. The binder removal and sintering may be done in one continuous firing step if desired.

The following examples are provided to further illustrate the invention. The invention is not limited to the specific details of the examples.

EXAMPLE 1

300 g. alumina powder (average particle size 2.5 μm) was combined with 138 g. deionized water, 0.5 g. NH$_4$OH, 3.75 g. Darvan ® 821A dispersant, 412 g. Vinex ® 2019 (17% solution of polyvinyl alcohol copolymer), and 50 g. triethylene glycol to form a slurry. The slurry was spray dried at 150° C. to form a coated powder.

The coated powder was then heated to about 180° C. and injection molded. The molded part was then heated to 600° C. at 0.10° C./min and held at 600° C. for one hour to remove the binder. The part was then fired at 1650° C. for about one hour to produce a densified part having over 97% of theoretical density. The dense part did not show any knit lines from molding.

EXAMPLE 2

300 g. alumina powder was combined with 138 g. deionized water, 0.5 g. NH$_4$OH, 3.75 g. Darvan ® 821A dispersant, 412 g. Vinex ® 2019 (17% solution) polyvinyl alcohol copolymer, 35 g. glycerol, and 35 g. Jeffamine ® ED6000 diamine were combined to form a slurry. The slurry was then spray dried at 150° C. to form a coated powder.

The coated powder was then heated to 170° C. and injection molded. The molded part was then heated to 600° C. at 0.1° C./min and held for one hour to remove the binder. The part was then fired at 1650° C. for one hour to produce a sintered part having over 97% of its theoretical density. The dense part did not show any knit lines from molding.

EXAMPLE 3

600 g. tetragonal zirconia was combined with 257.3 g. deionized water, 1.5 g NH$_4$OH, 7.6 g. Darvan ® 821A, 622.83 g. Vinex ® 2019 (17% soln.), 50 g. glycerol, and 50 g. Jeffamine ® ED6000 were combined to form a slurry. The slurry was then spray dried at 150° C. to form a coated powder.

The coated powder was then heated to 190° C. and injection molded. The molded part was then heated to 600° C. at about 0.1° C./min and held for one hour to remove the binder. The part was then fired at 1570° C. for about two hours to produce a densified part having over 97% of its theoretical density. The dense part did not show any knit lines form molding.

What is claimed is:

1. A method of forming a sintered ceramic body, said method comprising:
   a) combining ceramic powder, water and a water soluble copolymer of polyvinyl alcohol and poly(alkyleneoxy) acrylate to form a slurry containing about:
      35–40 parts by weight of ceramic powder,
      7.0–10.0 parts by weight of copolymer, and
      50–60 parts by weight of water,
   b) drying said slurry to form coated ceramic particles,
   c) heating said coated particles,
   d) injecting said heated particles into a mold to form a green ceramic body,
   e) cooling said green ceramic body,
   f) recovering said cooled body, and
   g) firing said recovered body to remove said copolymer and to sinter said ceramic.

2. The method of claim 1 wherein the slurry of step a) further includes a plasticizer.

3. The method of claim 2 wherein said plasticizer is a polyol.

4. The method of claim 1 wherein said coated particles have a moisture content of about 0–0.3 wt. %.

5. The method of claim 2 wherein the slurry of step a) further contains a dispersant.

6. The method of claim 1 wherein said drying is performed by spray drying.

7. The method of claim 8 wherein said spray drying is performed at a temperature of about 130°–150° C.

8. The method of claim 1 wherein said coated particles are heated to about 150°–190° C. during step c).

9. The method of claim 10 wherein the heated particles are injected directly into said mold.

10. The method of claim 1 wherein said ceramic powder includes a ceramic material selected from the group consisting of alumina, zirconia, titania, zirconium aluminum titanate, silica, silicon nitride and mixtures thereof.

11. The method of claim 12 wherein said powder further includes a sintering aid.

12. The method of claim 1 wherein said firing is performed at about 1300°–1800° C. and said sintered body has about 95°–100% of its theoretical density.

13. The method of claim 3 wherein said plasticizer is triethylene glycol.

* * * * *